(12) United States Patent
Penkman

(10) Patent No.: US 12,217,435 B2
(45) Date of Patent: Feb. 4, 2025

(54) METHODS AND SYSTEMS FOR SEGMENTING IMAGES

(71) Applicant: Canva Pty Ltd, Surry Hills (AU)

(72) Inventor: Lee Francis David Penkman, Cooranbong (AU)

(73) Assignee: CANVA PTY LTD, Surry Hills (AU)

( * ) Notice: Subject to any disclaimer, the term of this patent is extended or adjusted under 35 U.S.C. 154(b) by 434 days.

(21) Appl. No.: 17/829,404

(22) Filed: Jun. 1, 2022

(65) Prior Publication Data

US 2022/0398741 A1    Dec. 15, 2022

(30) Foreign Application Priority Data

Jun. 11, 2021   (AU) ................................ 2021203910

(51) Int. Cl.
*G06T 7/194*    (2017.01)
*G06T 7/11*     (2017.01)

(52) U.S. Cl.
CPC ................ *G06T 7/194* (2017.01); *G06T 7/11* (2017.01); *G06T 2207/20084* (2013.01)

(58) Field of Classification Search
CPC .. G06T 7/194; G06T 7/11; G06T 2207/20084
See application file for complete search history.

(56) References Cited

U.S. PATENT DOCUMENTS

2022/0044366 A1*   2/2022   Zhang ....................... G06T 7/12

* cited by examiner

*Primary Examiner* — Diane D Mizrahi
(74) *Attorney, Agent, or Firm* — GrowIP Law Group LLC

(57) ABSTRACT

The present disclosure is concerned with a computer implemented method for segmenting an image including a plurality of pixels. The method includes: processing the image to generate a first trimap and a second trimap, each trimap segmenting each pixel of the image into either a foreground region, a background region or an unknown region; performing a reconciliation algorithm on the first trimap and the second trimap to yield a merged trimap; processing the merged trimap and image to yield an alpha matte, the alpha matte including an alpha value for at least each pixel in the unknown region; and applying the alpha matte to the image to remove the background region therefrom.

20 Claims, 9 Drawing Sheets

METHODS AND SYSTEMS FOR SEGMENTING IMAGES

CROSS-REFERENCE TO RELATED APPLICATION

This application is a U.S. Non-Provisional Application that claims priority to Australian Patent Application No. 2021203910, filed Jun. 11, 2021, which is hereby incorporated by reference in its entirety

FIELD

The present disclosure is directed to methods and systems for segmenting images. More specifically, the present disclosure is directed to methods and systems for segmenting images into a background region and a foreground region so that the background region can be removed from the image.

BACKGROUND

Various computer implemented tools for creating and publishing visual content (such as social media graphics, presentations, posters, documents and other graphical content.) exist. Users of such tools may wish to incorporate images of their own making into the content in order to create a bespoke design. However, some user-generated images include extraneous background material that the user does not wish to use in their design. This leads to a need for techniques that can remove this extraneous background material to leave only the parts of the image that are of interest to the user.

The task of removing background material from an images can be error-prone and time consuming for a designer. While tools are available to automatically remove the background material, their performance tends to be suboptimal, particularly when used on images that contain a complex boundary between the background and the regions of interest.

The present disclosure aims to take an alternative approach to the problem of removing a background from an image.

Background information (as opposed to an image background) described in this specification is background information known to the inventors. Reference to this information as background information is not an acknowledgment or suggestion that this background information is prior art or is common general knowledge to a person of ordinary skill in the art.

SUMMARY

Described herein is a computer implemented method for processing an image comprising a plurality of pixels, the method comprising: processing the image to generate a first trimap and a second trimap, each trimap segmenting each pixel of the image into either a foreground region, a background region or an unknown region; performing a reconciliation algorithm on the first trimap and the second trimap to yield a merged trimap; processing the merged trimap and image to yield an alpha matte, the alpha matte comprising an alpha value for at least each pixel in the unknown region; and applying the alpha matte to the image to remove the background region therefrom.

Also described herein is a computer processing system comprising: a processing unit; and a non-transitory computer-readable storage medium storing instructions, which when executed by the processing unit, cause the processing unit to: access an image comprising a plurality of pixels; process the image to generate a first trimap and a second trimap, each trimap segmenting each pixel of the image into either a foreground region, a background region or an unknown region; perform a reconciliation algorithm on the first trimap and the second trimap to yield a merged trimap; process the merged trimap and image to yield an alpha matte, the alpha matte comprising an alpha value for at least each pixel in the unknown region; and apply the alpha matte to the image to remove the background region therefrom.

Figure 1:
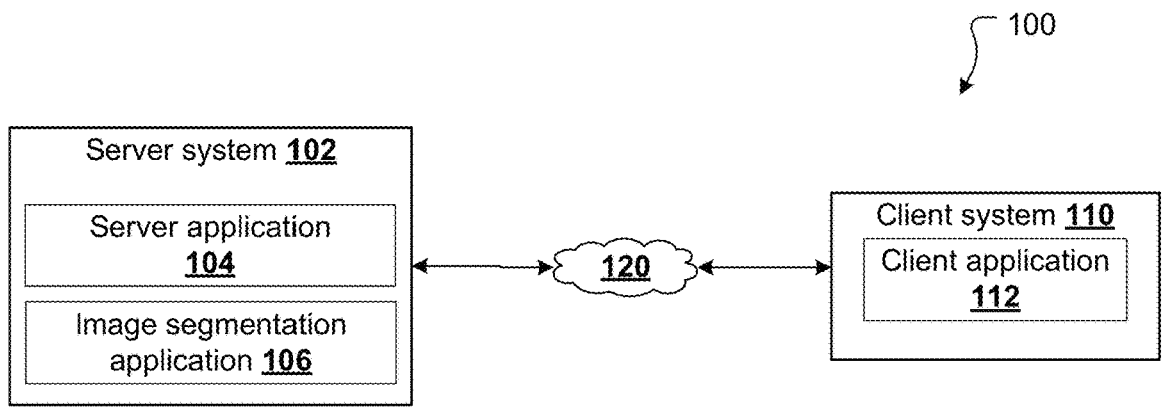
FIG. 1 is a block diagram illustrating an example environment in which features of the present disclosure can be implemented.

While the invention as claimed is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the spirit and scope of the present invention as defined by the appended claims.

DETAILED DESCRIPTION

In the following description numerous specific details are set forth in order to provide a thorough understanding of the claimed invention. It will be apparent, however, that the claimed invention may be practiced without these specific details. In some instances, well-known structures and devices are shown in block diagram form in order to avoid unnecessary obscuring.

The present disclosure is concerned with computer implemented techniques for segmenting images. In particular, the techniques of the present disclosure segment images into a foreground region and a background region. Once an image is segmented in this way, the background region can be suitably removed, leaving only the object or objects in the original image that are of interest to the user. The techniques of the present disclosure accurately remove the background, so that the object/s of interest are presented in sharp relief, substantially free from visual artefacts and other image corruptions. This allows users to create designs with transparent backgrounds and to incorporate the object/s of interest into other designs.

In the exemplified embodiment, the background-removal techniques are made available as an online service for users to access in a networked environment. However, those skilled in the art will appreciate that the techniques of the present disclosure could equally be implemented as a software application that executes solely or substantially on a users' local system.

By way of example, FIG. 1 depicts a networked environment 100 in which the various operations and techniques described herein can be performed.

Networked environment 100 includes a server system 102 and a client system 110 that are interconnected via a communications network 120 (e.g. the Internet). While a single client system 110 is illustrated and described, server system 102 will typically serve multiple client systems.

The server system 102 includes various functional components which operate together to provide server side functionality.

One component of server system 102 is a front-end server application 104. The server application 104 is executed by a computer processing system to configure the server system 102 to provide server-side functionality to one or more corresponding client applications (e.g. client application 112 described below). The server-side functionality includes operations such as user account management and login functionality. The server application 104 is also responsible for generating a user interface on the client system 110, through which users of the client system 110 access the services that the server application 104 provides.

To provide the server-side functionality, the server application 104 comprises one or more application programs, libraries, APIs or other software elements. For example, where the client application 112 is a web browser, the server application 104 will be a web server such as Apache, IIS, nginx, GWS, or an alternative web server. Where the client application 112 is a specific application, the server application 104 will be an application server configured specifically to interact with that client application 112. Server system 102 may be provided with both web server and application server modules.

An image segmentation application 106 that executes on server system 102 provides the image segmentation techniques according to the present disclosure. To this end, the image segmentation application 106 executes algorithms and stores and accesses the data structures described herein. As described in greater detail below, a number of these algorithms and data structures involve neural network processing. In the illustrated embodiment, the exemplified neural networks execute on the same system (namely server system 102) as the server application 104. However, those skilled in the art will appreciate that the neural network components of the image segmentation application 106 could readily be (and often are) executed on a dedicated server or server platform with specialised hardware (typically arrays of graphical processing units (GPUs)).

To avoid unnecessary obscuring, the image segmentation algorithms (including those involving neural network processing) are illustrated as flowcharts. However, those skilled in the art will appreciate that the algorithms and data structures can be readily expressed in a suitable high-level programming language (such as Python) and executed by a suitable runtime environment.

In the present example, server system 102 also includes a data store (not shown) which is used to store various data required by the server system 102 in the course of its operations. Such data may include, for example, user account data and data generated as a result of executing the image segmentation application 106. Server system 102 may include/make use of multiple separate data stores.

In order to provide server side functionality to clients, server system 102 will typically include additional functional components to those illustrated and described. As one example, server system 102 will typically include one or more firewalls (and/or other network security components), load balancers (for managing access to the server application 104), and or other components.

The server system 102 components have been described as functional components, and may be implemented by hardware, software (data and computer readable instructions which are stored in memory and executed by one or more computer processing systems), and/or a combination of hardware and software.

The precise hardware architecture of server system 102 will vary depending on implementation. Server system 102 will typically include multiple computer processing systems (e.g. server computers) which communicate with one another either directly or via one or more networks, e.g. one or more LANS, WANs, or other networks (with a secure logical overlay, such as a VPN, if required).

For example, as discussed above, server application 104 may run on a single dedicated server computer and image segmentation application 106 may run on a separate computer (with access to appropriate data storage resources). As an alternative example, server system 102 may be a scalable system configured to commission/decommission resources (e.g. server applications 104) based on user demand 104. In this case there may be multiple server computers (nodes) running multiple server applications 104 which service clients via a load balancer.

A single server system 102 has been shown in example environment 100. In certain embodiments, additional server systems may be accessible to a client system 110 (and/or server system 102)—for example third party content servers which the client and server systems can access to obtain design elements that can be added to designs.

Client system 110 hosts a client application 112 which, when executed by the client system 110, configures the client system 110 to provide client-side functionality for interacting with the server application 104 of the server system 102. Via the client application 112, users can interact with the server application 104, for example to upload images to the server system 102 for processing by the image segmentation application 106.

Client application 112 may be a web browser application (such as Chrome, Safari, Internet Explorer, Opera, or an alternative web browser application) which accesses the server application 104 via an appropriate uniform resource locator (URL) and communicates with server application 104 via general world-wide-web protocols (e.g. http, https, ftp). Alternatively, the client application 112 may be a specific application programmed to communicate with server application 104 using defined application programming interface (API) calls.

Client system 110 may be any computer processing system which is configured (or configurable) by hardware and/or software to offer client-side functionality. By way of example, client system 110 may be a desktop computer, a laptop computer, a netbook computer, a tablet computing device, a mobile/smart phone device, a personal digital assistant, or an alternative computer processing system.

Although not illustrated in FIG. 1, client system 110 will typically have additional applications installed thereon, for example at least an operating system application (e.g. a mobile operating system if client system is a mobile device, a desktop operating system if client system 110 is a desktop system, or an alternative operating system).

The architecture described above and illustrated in FIG. 1 is provided by way of example only. Many variations are possible.

The features and techniques described herein are implemented using one or more computer processing systems.

For example, in networked environment 100 described above, client system 110 is a computer processing system (for example a personal computer, tablet/phone device, or other computer processing system). Similarly, the various functional components of server system 102 are implemented using one or more computer processing systems (e.g. server computers or other computer processing systems).

Figure 2:
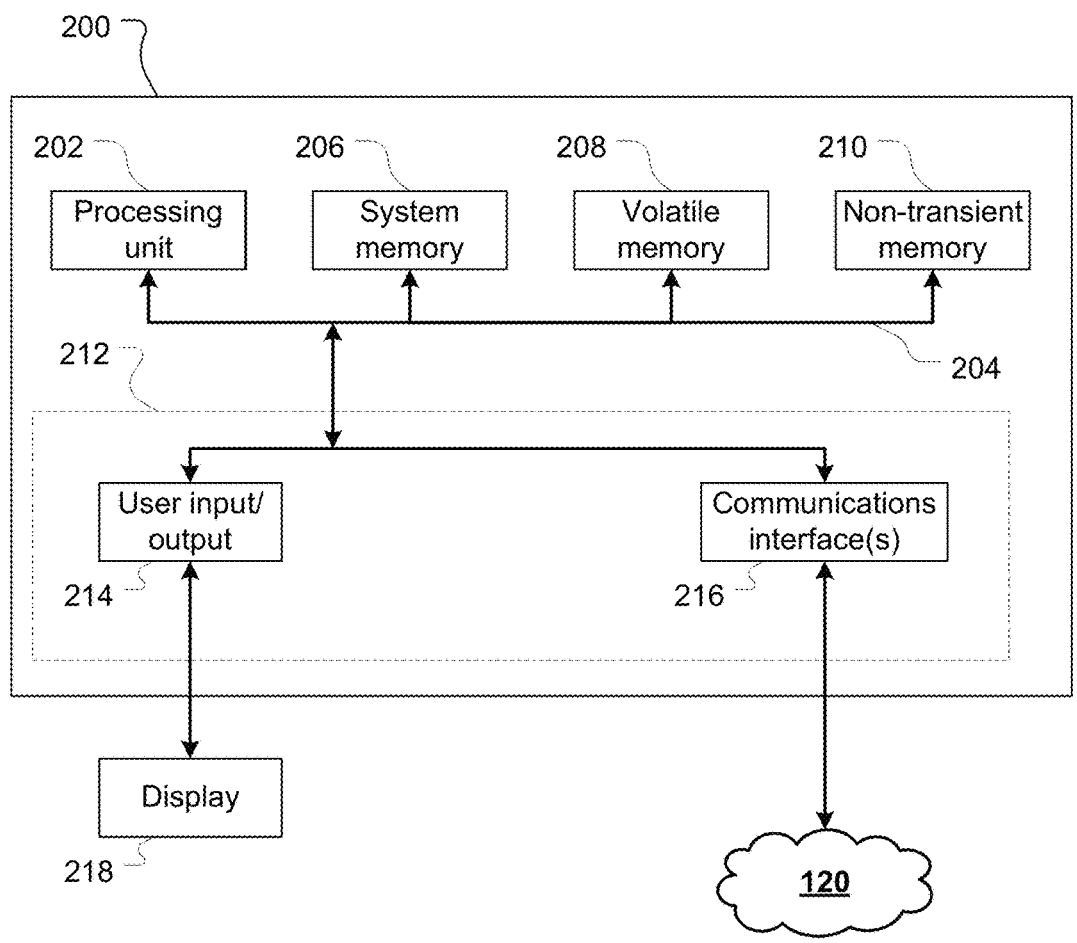
FIG. 2 is an example computer processing system configurable to perform various features described herein.

FIG. 2 provides a block diagram of a computer processing system 200 configurable to implement embodiments and/or features described herein. System 200 is a general purpose computer processing system. It will be appreciated that FIG. 2 does not illustrate all functional or physical components of a computer processing system. For example, no power supply or power supply interface has been depicted, however system 200 will either carry a power supply or be configured for connection to a power supply (or both). It will also be appreciated that the particular type of computer processing system will determine the appropriate hardware and architecture, and alternative computer processing systems suitable for implementing features of the present disclosure may have additional, alternative, or fewer components than those depicted.

Computer processing system 200 includes at least one processing unit 202. The processing unit 202 may be a single computer processing device (e.g. a central processing unit, graphics processing unit, or other computational device), or may include a plurality of computer processing devices. In some instances, where a computer processing system 200 is described as performing an operation or function all processing required to perform that operation or function will be performed by processing unit 202. In other instances, processing required to perform that operation or function may also be performed by remote processing devices accessible to and useable by (either in a shared or dedicated manner) system 200.

Through a communications bus 204 the processing unit 202 is in data communication with a one or more machine readable storage (memory) devices which store instructions and/or data for controlling operation of the processing system 200. In this example system 200 includes a system memory 206 (e.g. a BIOS), volatile memory 208 (e.g. random access memory such as one or more DRAM modules), and non-volatile memory 210 (e.g. one or more hard disk or solid state drives).

System 200 also includes one or more interfaces, indicated generally by 212, via which system 200 interfaces with various devices and/or networks. Generally speaking, other devices may be integral with system 200, or may be separate. Where a device is separate from system 200, connection between the device and system 200 may be via wired or wireless hardware and communication protocols, and may be a direct or an indirect (e.g. networked) connection.

Wired connection with other devices/networks may be by any appropriate standard or proprietary hardware and connectivity protocols. For example, system 200 may be configured for wired connection with other devices/communications networks by one or more of: USB; FireWire; eSATA; Thunderbolt; Ethernet; OS/2; Parallel; Serial; HDMI; DVI; VGA; SCSI; AudioPort. Other wired connections are possible.

Wireless connection with other devices/networks may similarly be by any appropriate standard or proprietary hardware and communications protocols. For example, system 200 may be configured for wireless connection with other devices/communications networks using one or more of: infrared; BlueTooth; WiFi; near field communications (NFC); Global System for Mobile Communications (GSM), Enhanced Data GSM Environment (EDGE), long term evolution (LTE), wideband code division multiple access (W-CDMA), code division multiple access (CDMA). Other wireless connections are possible.

Generally speaking, and depending on the particular system in question, devices to which system 200 connects—whether by wired or wireless means—include one or more input devices to allow data to be input into/received by system 200 for processing by the processing unit 202, and one or more output device to allow data to be output by system 200. Example devices are described below, however it will be appreciated that not all computer processing systems will include all mentioned devices, and that additional and alternative devices to those mentioned may well be used.

For example, system 200 may include or connect to one or more input devices by which information/data is input into (received by) system 200. Such input devices may include keyboards, mice, trackpads, microphones, accelerometers, proximity sensors, GPS devices and the like. System 200 may also include or connect to one or more output devices controlled by system 200 to output information. Such output devices may include devices such as a display (e.g. 218, such as a CRT, LCD, LED, plasma, touch screen, or other display), speakers, vibration modules, LEDs/other lights, and such like. System 200 may also include or connect to devices which may act as both input and output devices, for example memory devices (hard drives, solid state drives, disk drives, compact flash cards, SD cards and the like) which system 200 can read data from and/or write data to, and touch screen displays which can both display (output) data and receive touch signals (input).

System 200 also includes one or more communications interfaces 216 for communication with a network, such as network 120 of environment 100 (and/or a local network within the server system 102). Via the communications interface(s) 216 system 200 can communicate data to and receive data from networked devices, which may themselves be other computer processing systems.

System 200 may be any suitable computer processing system, for example, a server computer system, a desktop computer, a laptop computer, a netbook computer, a tablet computing device, a mobile/smart phone, a personal digital assistant, or an alternative computer processing system.

System 200 stores or has access to computer applications (also referred to as software or programs)—i.e. computer readable instructions and data which, when executed by the processing unit 202, configure system 200 to receive, process, and output data. Instructions and data can be stored on non-transitory machine readable medium accessible to system 200. For example, instructions and data may be stored on non-transitory memory 210. Instructions and data may be transmitted to/received by system 200 via a data signal in a transmission channel enabled (for example) by a wired or wireless network connection over an interface such as 214 or 216.

As described above, applications accessible to system 200 will typically include an operating system application.

System 200 also stores or has access to applications which, when executed by the processing unit 202, configure system 200 to perform various computer-implemented processing operations described herein. For example, and referring to the networked environment of FIG. 1 above: client system 110 includes a client application 112 which configures the client system 110 to perform the operations described herein.

In some cases, part or all of a given computer-implemented method will be performed by system 200 itself, while in other cases processing may be performed by other devices in data communication with system 200.

Image Segmentation

As noted above, the present disclosure is generally concerned with techniques for segmenting images into (at least) foreground and background regions. Once segmented in this way, the background region can be conveniently removed, leaving a processed image that contains only the object/s from the original image that are of interest to the user. Such a processed image can then be separately manipulated, such as in graphic design software and/or platforms, to produce new designs.

In the exemplified embodiment, users of client system 110 utilise the client application 112 to upload an input image to server system 102. Client application 112 displays a suitable graphical user interface on client system 110 for this purpose. The image segmentation application 106 processes the input image using the techniques described below, and makes the processed image available (in a suitable format) to the client application 112. Generally speaking, the image segmentation application 106 (or server application 104) makes the processed image available to the client application 112 by sending the client application 112 a URL from which the client application 112 can download the processed image.

Figure 3:
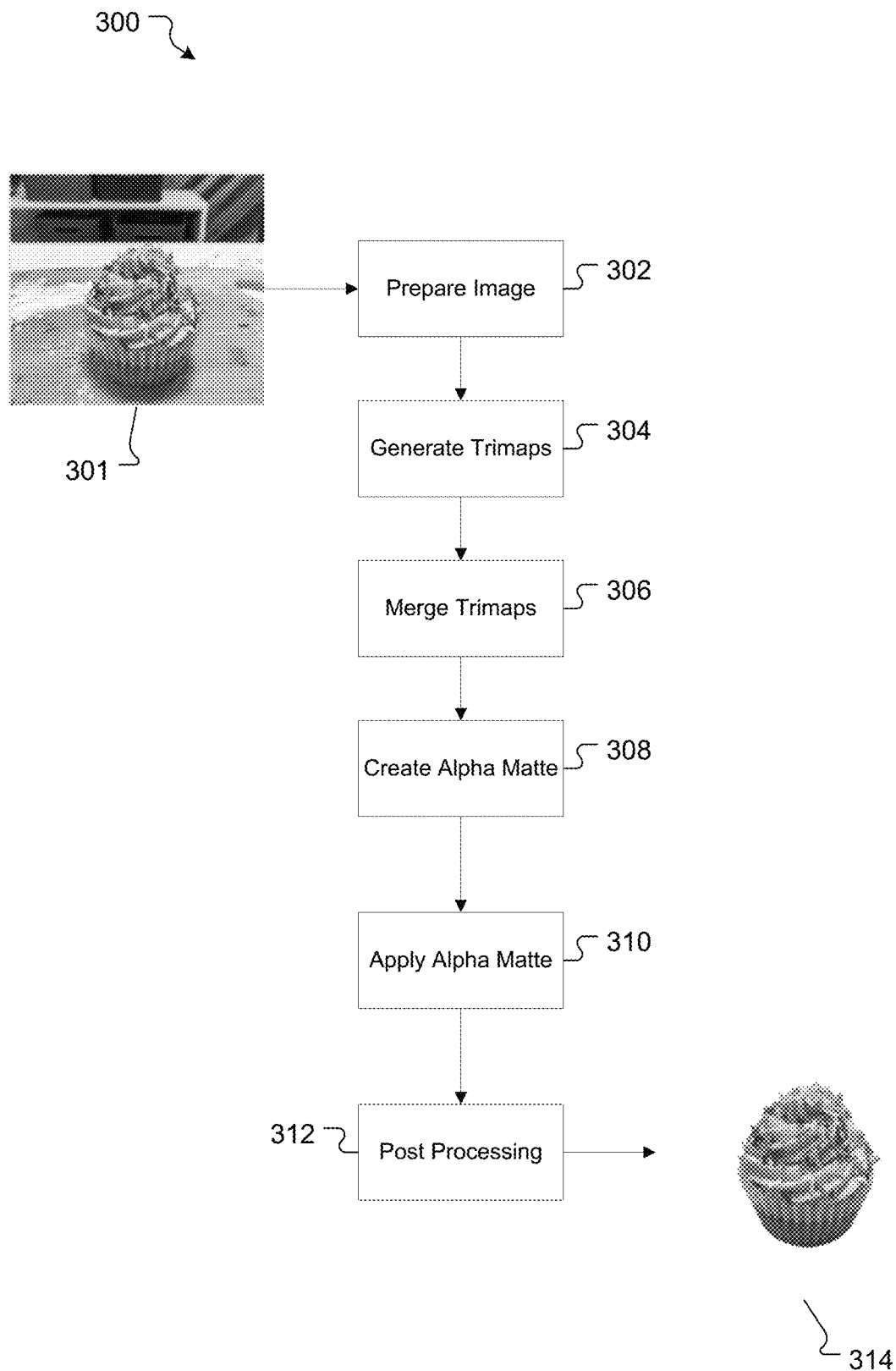
FIG. 3 is a flowchart depicting high-level operations performed to remove the background from an input image.

FIG. 3 is a flowchart depicting the high-level operations 300 that the image segmentation application 106 performs to remove the background from an input image 301. As noted above, the client application 112 typically uploads the input image 301 to the server system 102 for processing, including background removal.

The operations commence at step 302, at which the image segmentation application 106 prepares the input image 301 to make it better amenable for processing by the techniques of the present disclosure. The input image 301 comprises a two-dimensional array of pixels, each pixel including at least three component values to numerically represent the image intensity at the pixel's spatial location. In the RGB colour space, each pixel's component values represent the intensity of the respective red, green and blue colour channels. The resolution of the input image 301 is the number of pixels used to store the image, typically noted as the number of horizontal and vertical pixels in the array.

Image preparation 302 involves operations such as downsizing the input image 301, normalizing colour and compression. Those skilled in the art will appreciate that the particular image preparation operations applied will depend on the format and content of the input image. In some cases, the image segmentation application 106 will not need to apply any image preparation operations to the input image 301.

At step 304, the image segmentation application 106 performs operations (described in further detail below) to generate a pair of "trimaps" from the input image 301. In this regard, a trimap is a coarse segmentation of the input image 301, during which each pixel of the input image is allocated to one of three zones or regions, namely:
- a background region—for image pixels that belong to the background;
- a foreground region—for image pixels that belong to the foreground; and
- an unknown region—for image pixels for which it is currently unknown whether the pixel belongs to the background region or to foreground region.

As described in further detail below, the image segmentation application 106 generates the pair of trimaps (i.e the first trimap and the second trimap) by inputting the input image to two distinct trained trimap-generating neural networks. Previously, the user would manually create a trimap by drawing boundaries around the various regions in the image. Although in the exemplified embodiment of the present disclosure, neural networks are employed to automatically generate trimaps, the user can readily review the results of trimap generation and, if required, make any manual corrections to the generated regions. Likewise, the user is able to review the result of the overall background removal processing and make any necessary corrections.

The two neural networks are trained by increasing the sizes of training data images and decreasing learning rates. The two networks are distinct due to their being trained on different partitions of data or from targeting ground truth maps with different dilations of the unknown region (1-10 pixels and 1-16 pixels).

At step 306, the image segmentation application 106 performs operations (described in further detail below) to merge the first trimap and the second trimap into a single, merged trimap. As described below, the operations performed in step 306 involve the image segmentation application 106 applying a reconciliation algorithm to the first trimap and second trimap.

At step 308, the image segmentation application 106 performs operations (described in further detail below) to process the merged trimap and generate an alpha matte therefrom. In this regard, the task of background removal (or "image matting") can be defined mathematically by considering the observed colour $I_p$ of a pixel p as a combination of foreground $F_p$ and background $B_p$ colours, along with an alpha value $\alpha_p$, that stores a value for the pixel in a transparency-opacity spectrum. Or, expressed in equation form:

$$I_p = \alpha_p F_p + (1-\alpha_p) B_p, \alpha_p \in [0,1]$$

The operations performed at step 308 involve computing an alpha value for each pixel in the unknown region/s of the merged trimap. Alpha values need not be computed for pixels in the foreground or background regions, as these are already known (namely $\alpha_p=0$ for background pixels and $\alpha_p=1$ for foreground pixels).

As described below, the image segmentation application 106 computes an alpha value for each image pixel in the unknown region/s. The result of the computation is an allocation of each pixel in the unknown region, either to the foreground region, background region or to a foreground/background blended region. In other words, the result of the alpha value computation is an alpha value of 0 (for image pixels allocated to the background region), 1 (for image pixels allocated to the foreground region) and between 0 and 1 for image pixels allocated to the foreground/background blended region.

The alpha matte produced by the image segmentation application 106 can be viewed as a mask that defines (in addition to the alpha values) which pixels of the input image 301 are in the foreground and which pixels are in the background. At step 310, the image segmentation application 106 performs operations to apply the alpha matte to the input image. Such operations have the result of removing the background from the input image and may involve steps such as recolouring (or otherwise processing) each pixel that is indicated in the alpha matte as belonging to the background.

At step 312, the image segmentation application 106 performs post processing operations on the image generated at step 310. As described in further detail below, post processing is performed to ameliorate imperfections resulting (for example) from pixel re-colouring operations. Post processing can be applied to reduce instances of colour bleed that can adversely impact pixels, particularly those located on the boundary between the foreground and background regions.

Post-processed images 314 with reduced (or eliminated) colour bleed can be more seamlessly used in other environments, such as by being placed onto a wholly new background. It is the post-processed image that the server application 104 makes available to the client application 112 for download.

Figure 4:
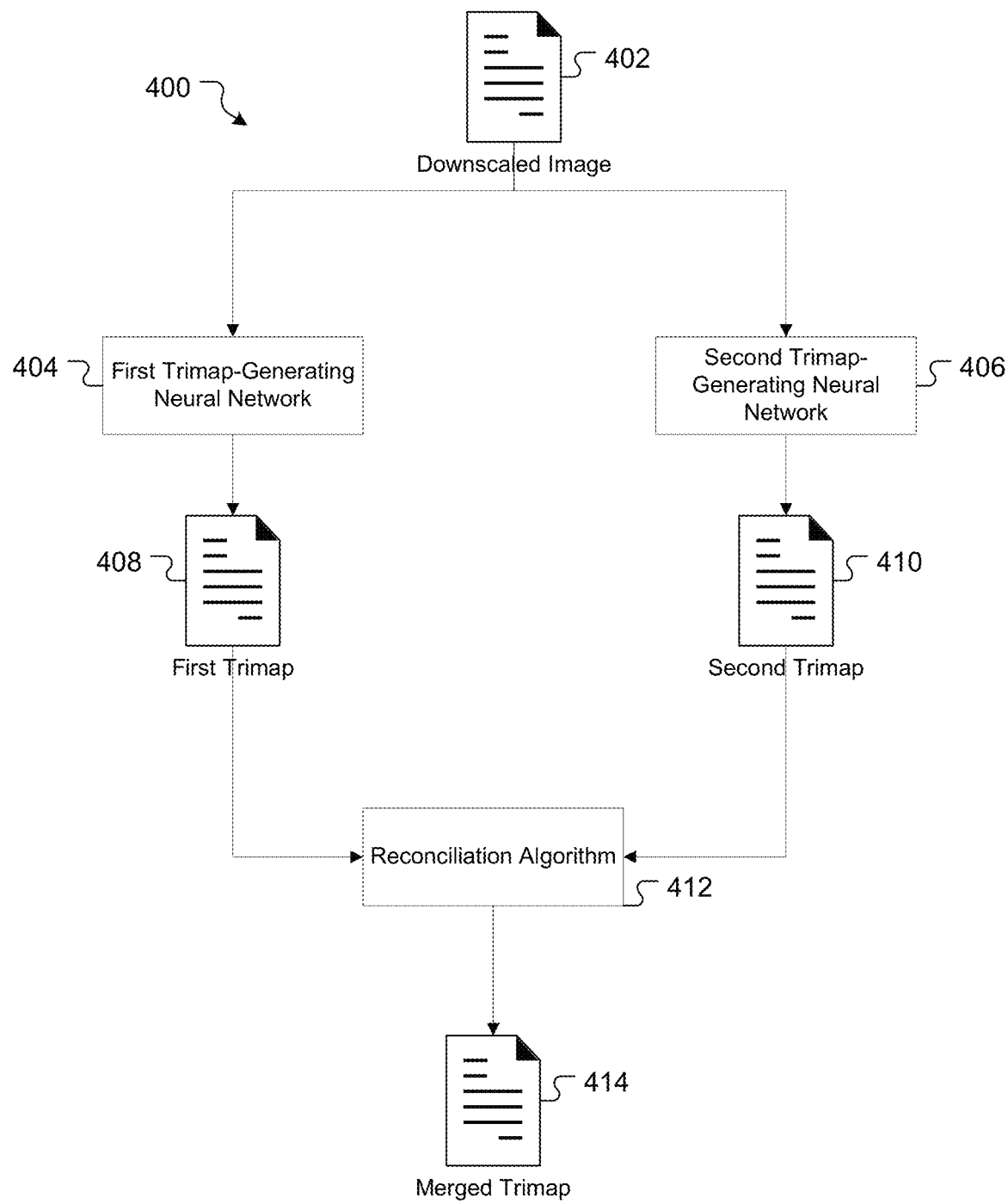
FIG. 4 is a flowchart depicting operations performed to generate and merge trimaps.

FIG. 4 is a flowchart depicting the operations 400 that the image segmentation application 106 performs in steps 304 and 306 of FIG. 3 to generate and merge the trimaps.

The image segmentation application 106 first downscales the input image 301 to a downscaled image 402. In the exemplified embodiment, the image segmentation application 106 performs downscaling using similar parameters to those used during training of two separate trimap-generating neural networks 404 and 406. The image segmentation application 106 also compresses the downscaled image using a suitable compression algorithm such as jpg 92.

The image segmentation application 106 inputs the same downscaled image 402 to the first trimap-generating neural network 404 and to the second trimap-generating neural network 406. The two neural networks 404 and 406 preferably perform image analysis and trimap generation in parallel. In this regard, neural networks 404 and 406 separately (and concurrently) process the downscaled image 402 to respectively output a first trimap 408 and a second trimap 410.

Neural networks 402 and 404 are preferably configured (either manually or automatically by the image segmenting application 106) to produce trimaps in a 0-1-2 (namely background, unknown, foreground) range. This allows the trimaps 408, 410 that the neural networks produce to be accurately upscaled to the original resolution (such as by using bicubic interpolation), while avoiding scaling artefacts.

After the neural networks 404 and 406 generate the two trimaps 408, 410, the image segmentation application 106 inputs the trimaps 408, 410 to a reconciliation algorithm 412. Reconciliation algorithm 412 can execute on the same computing platform as the image segmentation application (namely server system 102) or on other platforms located elsewhere in networked environment 100.

As discussed above, the reconciliation algorithm 412 processes the two trimaps 408 and 410 to yield a single merged trimap 414. It is the merged trimap 414 from which the image segmentation application 106 produces the alpha matte.

Figure 5:
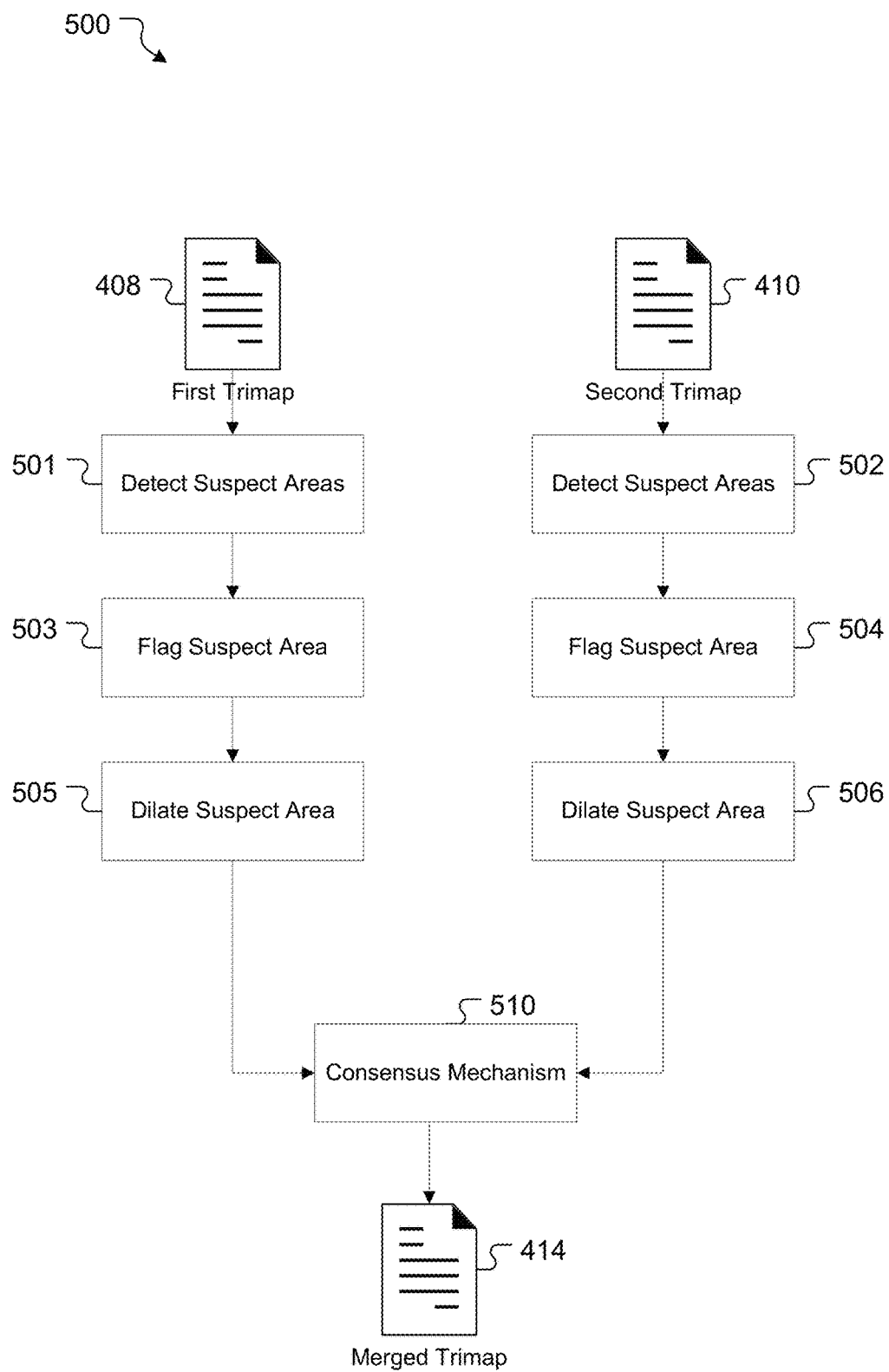
FIG. 5 is a flowchart depicting one embodiment of a reconciliation algorithm.

FIG. 5 is a flowchart depicting the operations 500 of the reconciliation algorithm 412 in more detail.

In this regard, the present disclosure addresses certain deficiencies of trimaps that are generated through automatic processes, such as neural networks. These deficiencies include incomplete trimaps (namely those containing areas of the original image that are not allocated to any trimap region), inaccurate trimaps (where areas of the original image are allocated to the wrong trimap region) and imprecise trimaps (for example a trimap with no unknown regions). The broad approach of the present disclosure to remedy such deficiencies is to utilise multiple trimaps and a reconciliation algorithm.

In the example reconciliation algorithm depicted in FIG. 5, the image segmentation application 106 processes the first trimap 408 and second trimap 410 through a series of parallel processing steps. The image segmentation algorithm then inputs the so-processed trimaps to a common consensus mechanism 510 that processes the processed trimaps and produces the merged trimap 414.

In this regard, the image segmentation algorithm 106, at steps 501 and 502 respectively processes the first and second trimaps 408, 410 to detect suspect areas depicted therein. There are various categories of suspect area that the image segmentation application 106 can detect. The system administrator specifies the different categories as parameters of the reconciliation algorithm 412.

One example of a suspect area (or "bad" or "bug" region) in a trimap is a foreground and background region in mutual contact without an intervening unknown region. In some cases, the presence of such areas in a trimap can be indicative of an "overconfident" trimap generation.

At steps 503 and 504, the image segmentation application 106 flags each detected suspect area to the reconciliation algorithm.

At steps 505 and 506, the image segmentation application 106, dilates the boundary of each detected suspect area. In one embodiment, the image segmentation application 106 dilates the boundary of the suspect area using spherical dilation of 10 pixels.

As described in further detail below, the consensus mechanism 510 that the image segmentation application 106 applies to the processed trimaps disregards any regions that are flagged as "bad" with the reconciliation algorithm. Rather than attempting to reconcile "bad" regions, the image segmentation algorithm 106 applies processing that substitutes, in the merged trimap 414, either the corresponding region from the other trimap, or marks the "bad" region as an unknown region in the merged trimap 414.

For other regions of the two trimaps 408 and 410, the image segmentation application 106 applies processing (by way of the consensus mechanism 510) that outputs any difference between the two trimaps 408 and 410 as an unknown region in the merged trimap 414. In other words, the consensus mechanism 510 acts as a filter that only returns a foreground or background region in the merged trimap 414, when the region has the same value in both trimaps 408 and 410 (namely both foreground or both background).

Figure 6:
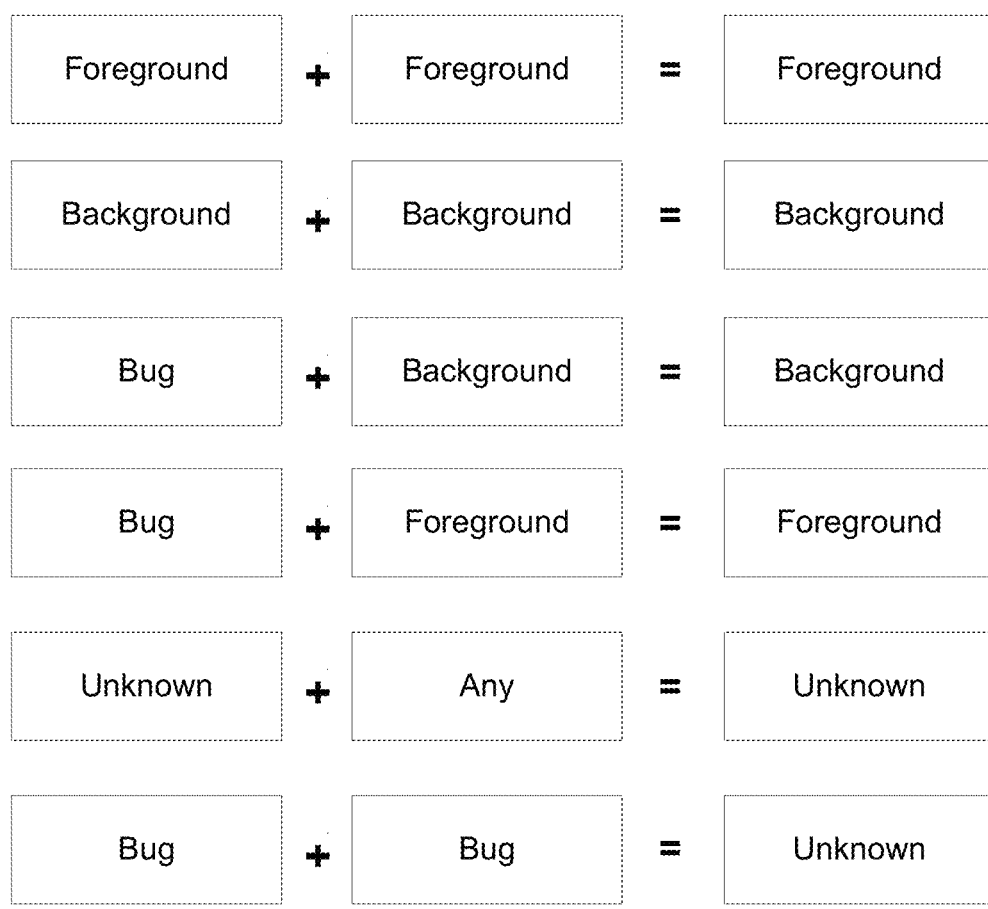
FIG. 6 is a flowchart depicting one embodiment of consensus mechanism.

The operation of the consensus mechanism 510 is illustrated schematically in FIG. 6, with "bad" regions shown as "bug" regions.

Other consensus mechanisms can be used with the present disclosure. For example, the trimap-generating neural networks 404 and 406 can be configured to omit the final softmax layer. In this scenario, the image segmentation application 106 applies a probability map to each of the trimaps 408 and 410 and assigns regions in the merged trimap 410 depending on the result. However, it is preferred to maintain the final softmax layer in the neural networks 404 and 406, as that layer provides valuable trained context, as well as contributing to runtime performance and quality performance.

Figure 7:
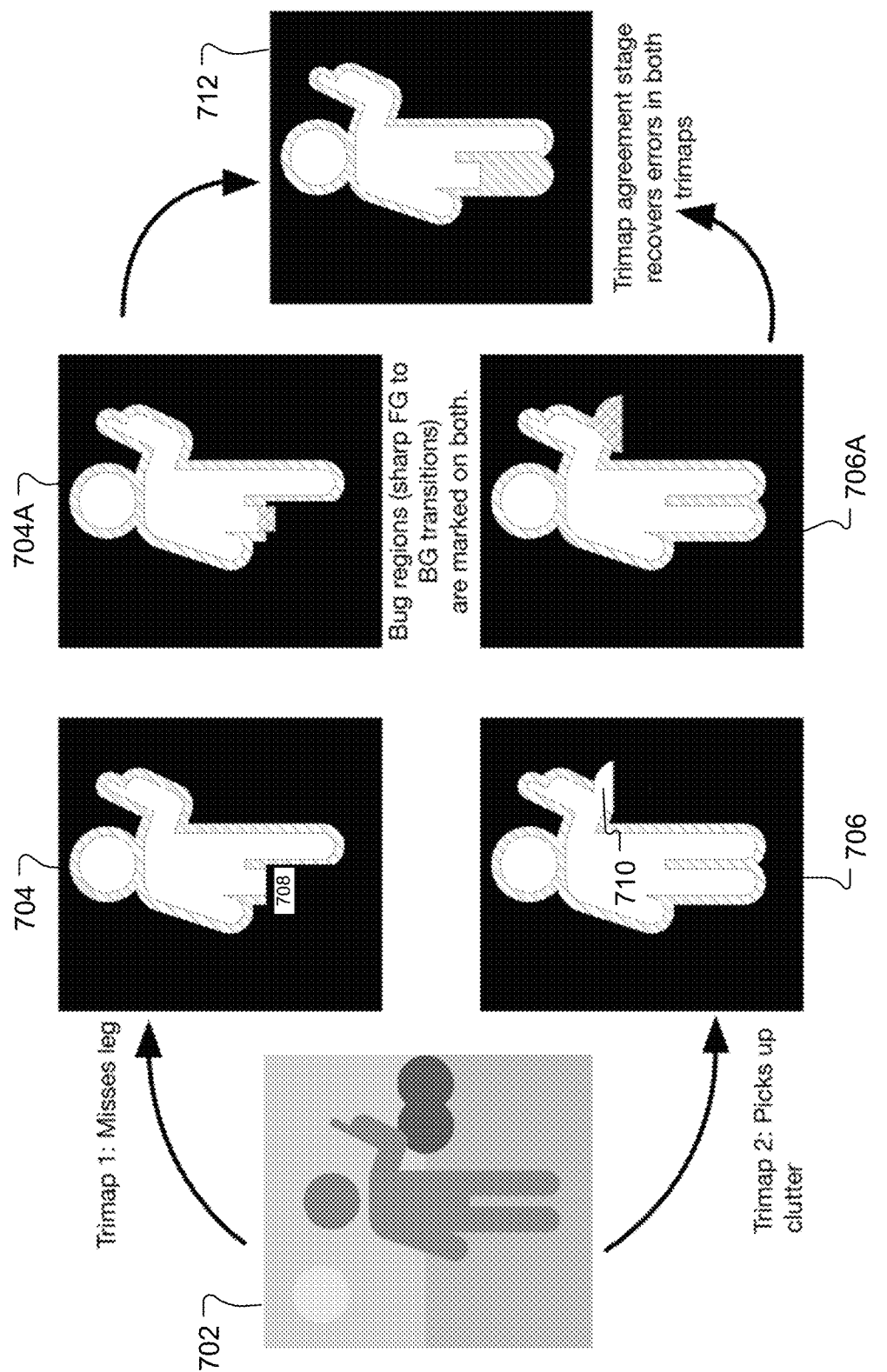
FIG. 7 is a flowchart depicting an example of trimap-generation and merging operations.

FIG. 7 illustrates one example of trimap-generation and merging operations according to an embodiment of the present disclosure. In FIG. 7, the image segmentation application 106 receives an input image 702. The image segmentation application 106 inputs the input image 702 to the trimap-generating neural networks 404 and 406 that respectively generate a first trimap 704 and a second trimap 706. Although generated from the same input image 702, trimaps 704 and 706 differ from each other in that trimap 704 omits a part 708 of the object depicted in the input image 702 (in this case the leg region), that is not omitted from trimap 706. In addition, in trimap 706, an extraneous (or "clutter") region 710 is incorrectly allocated to the foreground region, whereas in trimap 704, the spatial region corresponding to region 710 is correctly allocated either to the background region (illustrated in black) or to the unknown region (illustrated in diagonal-line hatching).

In the case of trimap 704, the image segmentation application 106 processes the trimap and detects part 708. As described above, the image segmentation application 704 is able to detect part 708 (for example through using a suitable edge detection routine), due to the part including an area where a foreground region directly abuts a background region. In this scenario, the image segmentation application 106 processes trimap 704 to produce trimap 704A. Trimap 704A includes a bug region (shown in crosshatches) that the image segmentation application 106 produces by dilating the edge between the directly-abutting foreground region and background region.

In the case of trimap 706, the image segmentation application 106 processes the trimap and detects part 710, similarly by determining that it includes an area where a foreground region directly abuts a background region. Likewise, the image segmentation application 106 processes trimap 706 to produce trimap 706A. Trimap 706A includes a bug region (shown in crosshatches) that the image segmentation application 106 produces by dilating the edge between the directly abutting foreground region and background region.

The image segmentation application 106 flags the bug regions with the reconciliation algorithm 412 and, in the illustrated embodiment, substitutes each bug region with its corresponding spatial region in the other trimap. In the case of part 708, the corresponding spatial region in trimap 706 is in both the foreground region and unknown region. In the case of part 710, the corresponding spatial region in trimap 704 is in both the background region and unknown region.

FIG. 7 illustrates a merged trimap 712 that results from the image segmentation application 106 performing the consensus mechanism 510 of the reconciliation algorithm 412 on the processed trimaps 704A and 706A. Due to the operation of the consensus mechanism 510, the merged trimap 712 is able to recover from the errors present in the pre-processed trimaps 704 and 706. In particular, the leg region that was incorrectly allocated to the background region in trimap 704, is in the unknown region of merged trimap 712. In addition, the clutter region 710 present in trimap 706 is not present in merged trimap 712.

Figure 8:
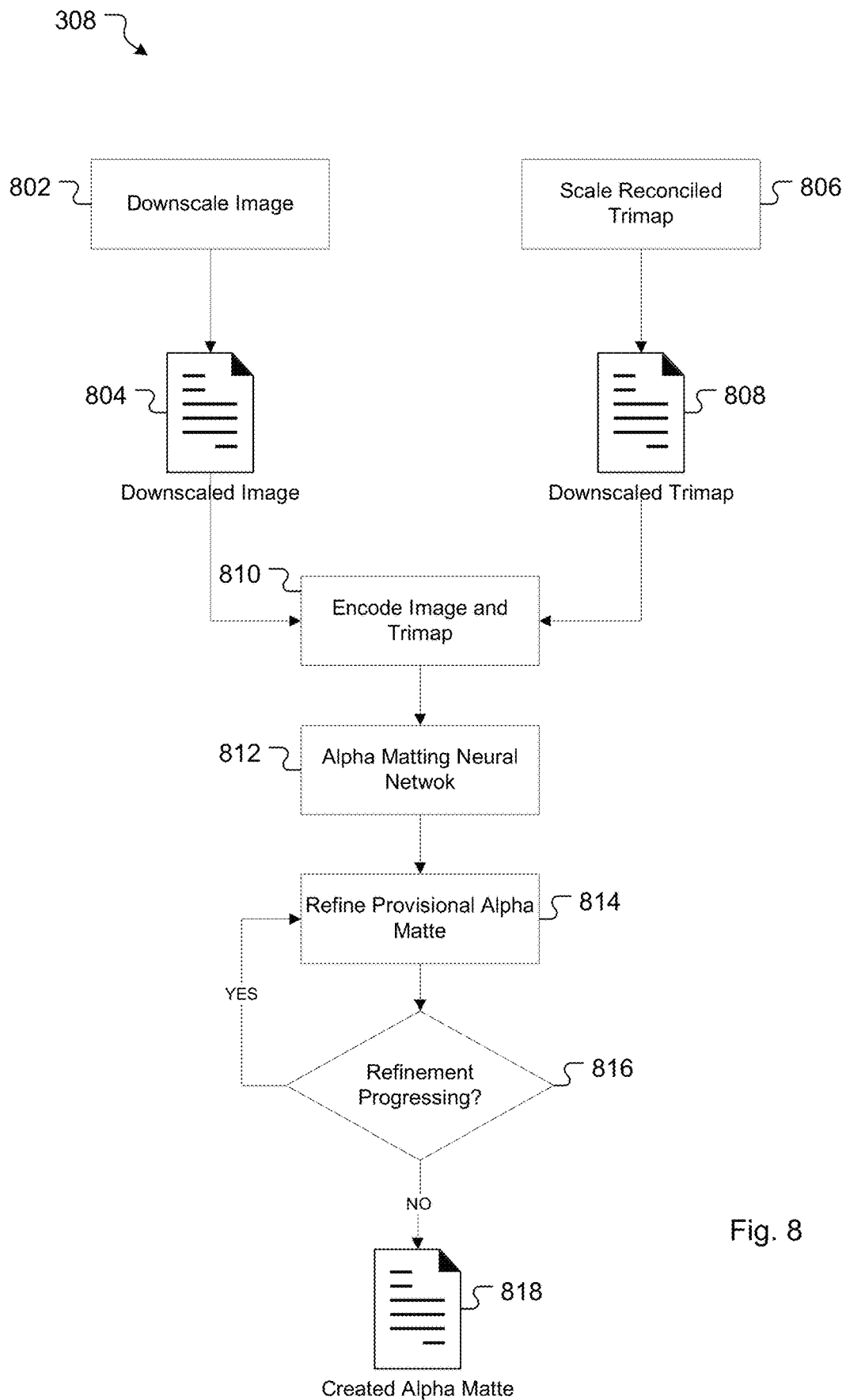
FIG. 8 is a flowchart depicting operations involved in creating an alpha matte from a merged trimap.

FIG. 8 is a flowchart depicting in more detail, the operations 308 that the image segmentation application 106 performs to create an alpha matte from the merged trimap 414 or 712. In the example operations depicted in FIG. 8, the image segmentation application 106 pre-processes both the original image 302 or 702 and merged trimap 414 or 712 (typically in parallel) prior to inputting the pre-processed image and trimap to a trained alpha matting neural network that creates an alpha matte therefrom.

The operations commence at step 802, at which the image segmentation application 106 downscales the original image to produce a downscaled image 804. In the illustrated embodiment, the image segmentation application 106 downscales the original image to a downscaled image of approximately 56% the resolution of the downscaled image.

At step 806, the image segmentation application 106 downscales the merged trimap to produce downscaled trimap 808. The image segmentation application 106 downscales the merged trimap to the same extent as the original image; in the illustrated embodiment to a resolution of approximately 56% of the resolution of the merged trimap.

At step 810, the image segmentation application 106 encodes the downscaled image and downscaled trimap into a suitable form for processing by a trained neural network. In the illustrated embodiment, the image segmentation application 106 encodes the image's constituent RGB pixel values and the trimap's constituent pixel region values into a single data object. The trimaps's pixel region values are formatted in the data object using a one-hot encoding with three Boolean channels.

At step 812, the image segmentation application 106 inputs the data object to a trained alpha matting neural network. In the illustrated embodiment, the alpha matting neural network is an encoder/decoder network with inputs and weights quantized to 16 bits of precision. The encoder/decoder network encodes higher level spatial features of the input image that the shallower levels of the network identify when the input image is still at a higher resolution. These encoded spatial features are then used to decode the detailed features of the image (that the deeper layers of the network identify in lower-resolution segments of the image) into the original image context.

The alpha matting neural network utilises spectral normalisation, batch normalisation, and an attention mechanism with radial weightings applied at multiple scales during both encoder and decoder stages of processing.

The alpha matting neural network computes an alpha value for each pixel in the input image by reference to the corresponding and neighbouring pixel region values in the trimap. The alpha matting neural network computes alpha values for pixels in the unknown region using propagation techniques, in conjunction with predefined rules for allocating pixels in the unknown region either to the foreground region or to the background region.

The alpha value for pixels having a pixel region value of 255 or 0 in the trimap (indicating that the pixel is respectively in the foreground or background) is clamped to these values by the alpha matting neural network. This allows the alpha matting neural network to dedicate GPU resources to compute alpha values for pixels in the unknown region of the trimap, and in doing so, produce an accurate semi-transparent boundary prediction.

If the image is already transparent and contains a pre-existing alpha channel, image segmentation algorithm 106 stores any later-computed alpha value as that pixel's minimum of the predicted or existing alpha value. This ensures that the alpha matting neural network always shrinks alpha values for each pixel. This enables the image segmentation algorithm 106 to remove the background of images that are already transparent without incorrectly adding already-hidden transparent regions.

If an input image is too large to be processed within a GPU memory, the image segmentation application 106 first partitions the image (and the corresponding trimap) into sub-tiles having a large degree of overlap. The alpha matting neural network typically processes all subtitles concurrently in a single batch. The image segmentation application 106 recombines the computed alpha values for each sub-tile into a single alpha matte using a Gaussian weighting.

The result of the alpha matting neural network computing an alpha value for each pixel in the input image is a provisional alpha matte.

At step 814, the image segmentation application 106 performs operations to refine the provisional alpha matte and potentially improve its accuracy. In this regard, the alpha matting neural network almost invariably makes pixel colour similarity and/or smoothness assumptions to allocate pixels to either the foreground or background region and demarcate a (typically semi-transparent) boundary therebetween. The alpha matting neural network in some cases applies a suboptimal pixel allocation, particularly to images in which the background is similarly coloured to the foreground. The alpha matting neural network may also demarcate an inaccurate boundary between foreground and background regions when opacity fluctuates along the boundary. In this scenario, the neural network struggles to fill in holes of opacity occurring along the boundary (such as those created by wavy hair).

The image segmentation application 106 performs operations to refine the provisional alpha matte in order to remedy these (and possibly other) deficiencies.

In the illustrated embodiment, the image segmentation application 106 refines the provisional alpha matte by first dilating a secondary unknown region around any semi-transparent boundaries in the provisional alpha matte. The semi-transparent boundaries in the provisional alpha matte are dilated and used to set unknown regions of a new trimap. By dilating these boundaries, and thereby introducing a new unknown region into the provisional alpha matte, the image segmentation application 106 creates a new trimap from the provisional alpha matte. The new trimap is set to foreground where the provisional alpha matte is completely foreground and background where the provisional alpha matte is completely background.

Next, the image segmentation application 106 inputs the new trimap and the original image to the alpha matting neural network. The alpha matting neural network then produces a new alpha matte.

At step 816, the image segmentation application 106 performs operations to determine whether the alpha matte refinement operation, is progressing. In the illustrated embodiment, the image segmentation application 106 assesses progress by measuring the momentum as a mean intersection over union (mIOU) between the input trimap and the new trimap. As noted above, the new trimap is generated by converting the new output alpha matte into a trimap using dilation of the semi-transparent region, followed by setting the semi-transparent region to an unknown region during conversion.

In the event that the refinement operation is progressing, the image segmentation application 106 sets the new alpha matte as the provisional alpha matte. Processing then returns to step 814, at which the image segmentation application 106 performs operations to refine the (new) provisional alpha matte. In subsequent iterations of step 814, the image segmentation application 106 applies smaller dilations of the new unknown region at a higher resolution.

In the event that the refinement operation is not progressing, the image segmentation application 106 outputs the provisional alpha matte as the created alpha matte 818.

Figure 9:
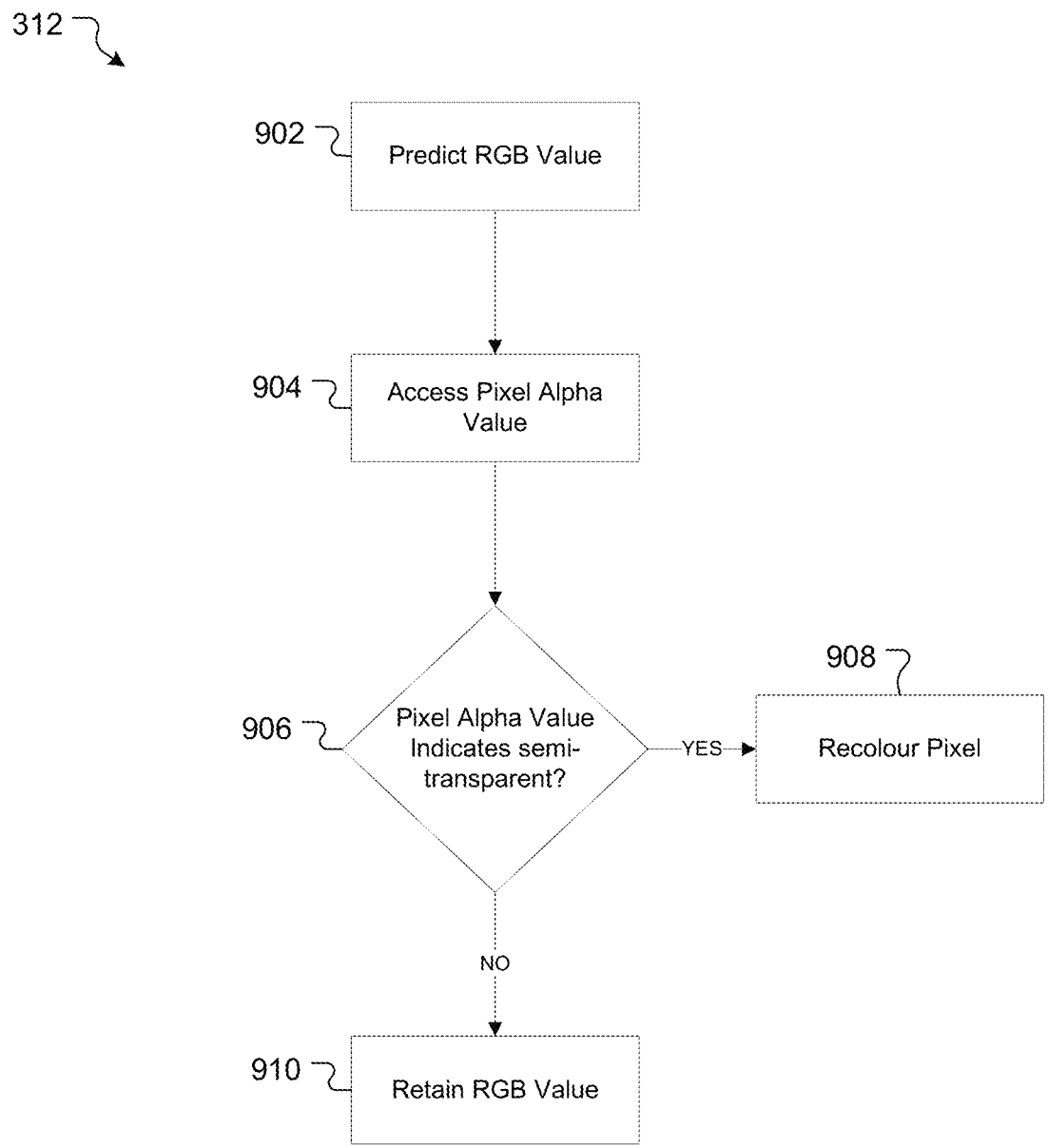
FIG. 9 is a flowchart depicting operations involved in post processing an alpha matte.

FIG. 9 is a flowchart depicting the post processing operations 312 in more detail.

The post processing operations commence at step 902, at which the image segmentation application 106 predicts, for each pixel in the input image, the RGB value that will result when the alpha matte is applied to the input image to remove the background therefrom. In the illustrated embodiment, the image processing application 106 computes predicted RGB values using a fast multilevel foreground extraction technique. Other RGB prediction techniques can be applied with appropriate modifications.

At step 904, the image segmentation algorithm 106 accesses the alpha value of the current pixel from the alpha matte.

In the present embodiment, step 904 is only performed when the predicted RGB value noticeably differs from the RGB value of the corresponding pixel in the input image.

At step 906, the image segmentation algorithm 106 determines whether the alpha value indicates that the pixel is semi-transparent (namely when the pixel's observed colour has contributions from both the background and foreground and is thus more susceptible to colour bleed).

In the event that the alpha value indicates that the pixel is semi-transparent, the image segmentation algorithm 106 recolours the pixel in the post processed image 314 (step 908). Techniques such as fast multilevel foreground extraction can be used to recolour pixels.

In the event that the alpha value indicates that the pixel is other than semi-transparent, the image segmentation application 106 retains the RGB value of the current pixel in the post-processed image 314 (step 910).

Pixels are set to black where any values in the alpha matte indicate that the relevant pixel is fully transparent. This is to achieve a higher png compression of the post-processed image 314 without losing quality.

Figure 10:
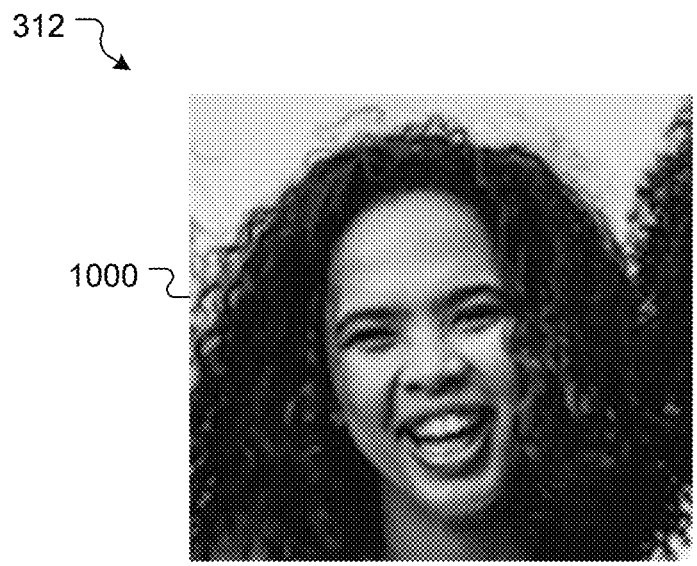
FIG. 10 illustrates one example of the result of applying post-processing operations to an alpha matte.
Figure 10:
Figure 10:
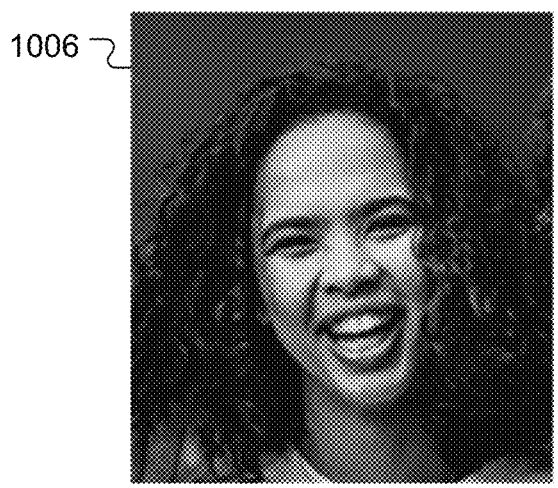

FIG. 10 illustrates the result of applying the exemplified post-processing operations 312. FIG. 10 shows an input image 1000 and an example of a processed image 1002 from which the background has been removed. Processed image 1002 includes a colour bleed region 1004. The colour bleed region 1004 is a section of the input image 1002 that the alpha matting neural network correctly allocated to the foreground region, but due to its proximity to the background region, the enclosed pixels are inaccurately coloured.

FIG. 10 also illustrates the post-processed image 1006 that results from applying the post-processing operations 312 to the processed image 1004. Significantly, the pixels in the colour bleed region have been recoloured in a way that effectively removes the colour bleed region from the image. This allows the post-processed image 1006 to be used on a new background.

Through the client application 112, the user of client system 110 can provide feedback to the image segmentation application 106 during different stages of its processing. In some cases, the user feedback alters the operation of the image segmentation application 112.

For example, after the alpha matting neural network creates the alpha matte 818, the server application 104 optionally renders a user interface on client application 112 that displays the result of applying the alpha matte to the input image to remove the background therefrom. Through the user interface, the user can mark regions of the resulting image that, in the user's assessment, correspond to alpha values of 255 or 0. The server application 104 then suitably overlays the hidden original on top of the marked image, thus painting the selected regions in or out of the image.

In another example, the client application 112 sends the user's markups of the resulting image to the server application 104. In this regard, the user's markups constitute a new alpha matte and a new trimap with different excluded areas and included areas. In this scenario, the image segmentation application 106 is free to perform modified processing, involving omitting the step of trimap creation and reconciliation, and instead processing the new alpha matte to allocate any semi-transparent regions to an unknown region and dilating the semi-transparent region by a suitable number of pixels (such as 8 pixels).

The image segmentation application 104 then performs alpha matte refinement on the new alpha mattes. At the commencement of each stage of iterative refinement, the image segmentation application 104 clamps any user-excluded regions to background and user-included regions to foreground. This ensures that the image segmentation application 104 cannot undo work that a user has performed manually.

Post-processing can then be performed on the refined alpha matte.

The flowcharts illustrated in the figures and described above define operations in particular orders to explain various features. In some cases the operations described and illustrated may be able to be performed in a different order to that shown/described, one or more operations may be combined into a single operation, a single operation may be divided into multiple separate operations, and/or the function(s) achieved by one or more of the described/illustrated operations may be achieved by one or more alternative operations. Still further, the functionality/processing of a given flowchart operation could potentially be performed by different systems or applications.

Unless otherwise stated, the terms "include" and "comprise" (and variations thereof such as "including", "includes", "comprising", "comprises", "comprised" and the like) are used inclusively and do not exclude further features, components, integers, steps, or elements.

It will be understood that the embodiments disclosed and defined in this specification extend to alternative combinations of two or more of the individual features mentioned in or evident from the text or drawings. All of these different combinations constitute alternative embodiments of the present disclosure.

The present specification describes various embodiments with reference to numerous specific details that may vary from implementation to implementation. No limitation, element, property, feature, advantage or attribute that is not expressly recited in a claim should be considered as a required or essential feature. Accordingly, the specification and drawings are to be regarded in an illustrative rather than a restrictive sense.

The invention claimed is:

1. A method for processing an image comprising a plurality of pixels, the method comprising:
   processing, by one or more computer devices, the image and generating a first trimap and a second trimap, each trimap segmenting each pixel of the image into either a foreground region, a background region or an unknown region;
   generating a merged trimap by processing the first trimap and the second trimap according to a reconciliation algorithm;
   processing, by the one or more computer devices, the merged trimap and image to yield an alpha matte, the alpha matte comprising an alpha value for at least each pixel in the unknown region;
   generating a processed image by applying the alpha matte to the image to remove the background region therefrom; and
   outputting the processed image.

2. The method according to claim 1, wherein processing the first trimap and the second trimap according to the reconciliation algorithm comprises applying a consensus mechanism to the first trimap and second trimap, the consensus mechanism:
   including a foreground region or background region in the merged trimap when a corresponding foreground region or background region is present in both the first trimap and the second trimap; and
   including an unknown region in the merged trimap when a corresponding unknown region is present in either the first trimap or the second trimap.

3. The method according to claim 2, wherein processing the first trimap and the second trimap according to the reconciliation algorithm further comprises:
   detecting a characteristic region in either the first trimap or the second trimap; and
   substituting for the characteristic region, a corresponding region in the other of the first trimap or second trimap.

4. The method according to claim 3, wherein the characteristic region comprises a foreground and background region in mutual contact without an intervening unknown region.

5. The method according to claim 1, wherein processing the merged trimap and image comprises inputting the merged trimap and image to an alpha matting neural network, the alpha matting neural network creating the alpha matte.

6. The method according to claim 5, wherein the alpha matting neural network creates a provisional alpha matte and the method further comprises refining the provisional alpha matte to create a refined alpha matte by:
   creating a new trimap from the provisional alpha matte; and
   inputting the new trimap and the image to the alpha matting neural network to create the refined alpha matte.

7. The method according to claim 6, wherein creating the new trimap from the provisional alpha matte comprises:
   processing alpha values to detect a boundary between a foreground region and a background region; and
   dilating a secondary unknown region around the boundary.

8. The method according to claim 6, wherein refining the provisional alpha matte to create the refined alpha matte further comprises iteratively performing the steps of creating a subsequent trimap from a refined alpha matte and inputting the subsequent trimap and image to the alpha matting neural network to create a further refined alpha matte.

9. The method according to claim 1, further comprising post-processing the image after generating the processed image by applying the alpha matte thereto by:
   determining pixel values that result from applying the alpha matte to the image; and recolouring selected ones of the pixels having determined pixel values that differ from the pixel value of the corresponding pixel in the image.

10. The method according to claim 9, wherein the selected pixels are those having an alpha value in a predetermined range.

11. A system comprising:
one or more computer devices; and
a non-transitory computer-readable storage medium storing instructions, which when executed by the one or more computer devices, cause the one or more computer devices to:
access an image comprising a plurality of pixels;
process the image and generate a first trimap and a second trimap, each trimap segmenting each pixel of the image into either a foreground region, a background region or an unknown region;
generate a merged trimap by processing the first trimap and the second trimap according to a reconciliation algorithm;
process the merged trimap and image to yield an alpha matte, the alpha matte comprising an alpha value for at least each pixel in the unknown region;
generate a processed image by applying the alpha matte to the image to remove the background region therefrom; and
output the processed image.

12. The system according to claim 11, wherein processing the first trimap and the second trimap according to the reconciliation algorithm comprises applying a consensus mechanism to the first trimap and second trimap, the consensus mechanism:
including a foreground region or background region in the merged trimap when a corresponding foreground region or background region is present in both the first trimap and the second trimap; and
including an unknown region in the merged trimap when a corresponding unknown region is present in either the first trimap or the second trimap.

13. The system according to claim 12, wherein processing the first trimap and the second trimap according to the reconciliation algorithm further comprises:
detecting a characteristic region in either the first trimap or the second trimap; and
substituting for the characteristic region, a corresponding region in the other of the first trimap or second trimap.

14. The system according to claim 13, wherein the characteristic region comprises a foreground and background region in mutual contact without an intervening unknown region.

15. The system according to claim 11, wherein processing the merged trimap and image comprises inputting the merged trimap and image to an alpha matting neural network, the alpha matting neural network creating the alpha matte.

16. The system according to claim 15, wherein the alpha matting neural network creates a provisional alpha matte, and wherein execution of the instructions further causes the one or more computer devices to refine the provisional alpha matte to create a refined alpha matte by:
creating a new trimap from the provisional alpha matte; and
inputting the new trimap and the image to the alpha matting neural network to create the refined alpha matte.

17. The system according to claim 16, wherein creating the new trimap from the provisional alpha matte comprises:
processing alpha values to detect a boundary between a foreground region and a background region; and
dilating a secondary unknown region around the boundary.

18. The system according to claim 17, wherein refining the provisional alpha matte to create the refined alpha matte further comprises iteratively performing the steps of creating a subsequent trimap from a refined alpha matte and inputting the subsequent trimap and image to the alpha matting neural network to create a further refined alpha matte.

19. The system according to claim 11, wherein execution of the instructions further causes the one or more computer devices to post-process the image after generating the processed image by applying the alpha matte by:
determining pixel values that result from applying the image matte to the image;
recolouring selected ones of the pixels having determined pixel values that differ from the pixel value of the corresponding pixel in the image.

20. The system according to claim 19, wherein the selected pixels are those having an alpha value in a predetermined range.

* * * * *